Oct. 17, 1967 C. A. RAMSEL 3,347,113
TRANSMISSION
Filed June 28, 1965 4 Sheets-Sheet 3
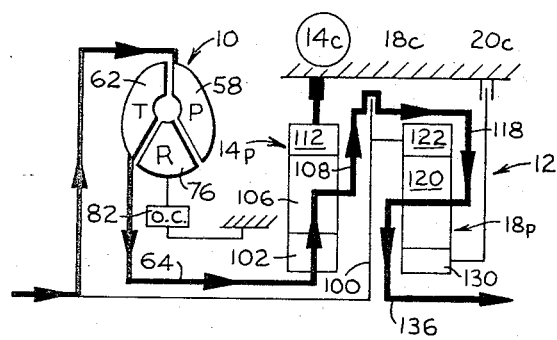
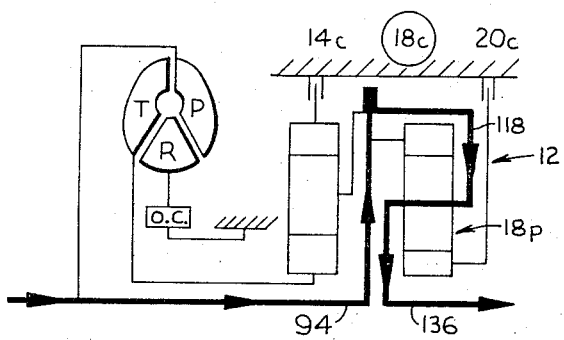
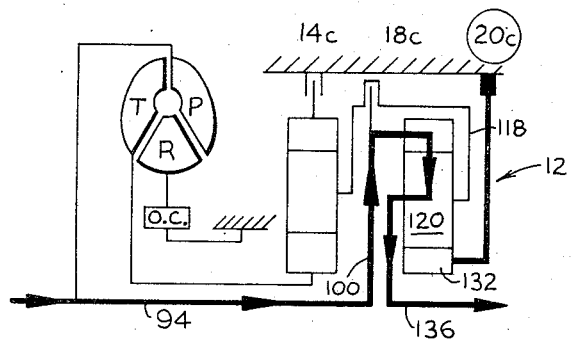
INVENTOR.
CHARLES A. RAMSEL
BY
Fryer, Tjensvold, Feix & Phillips
ATTORNEYS

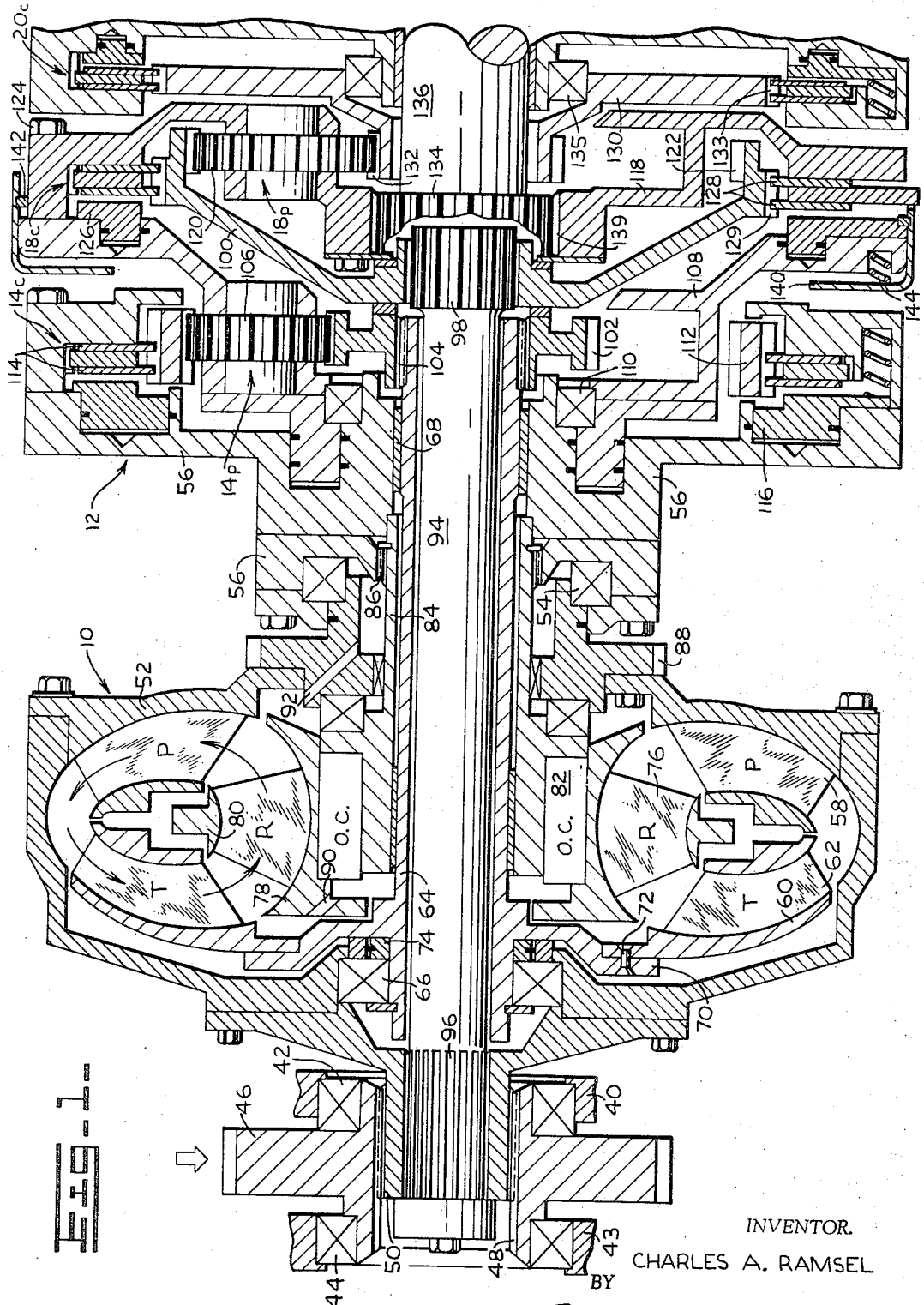

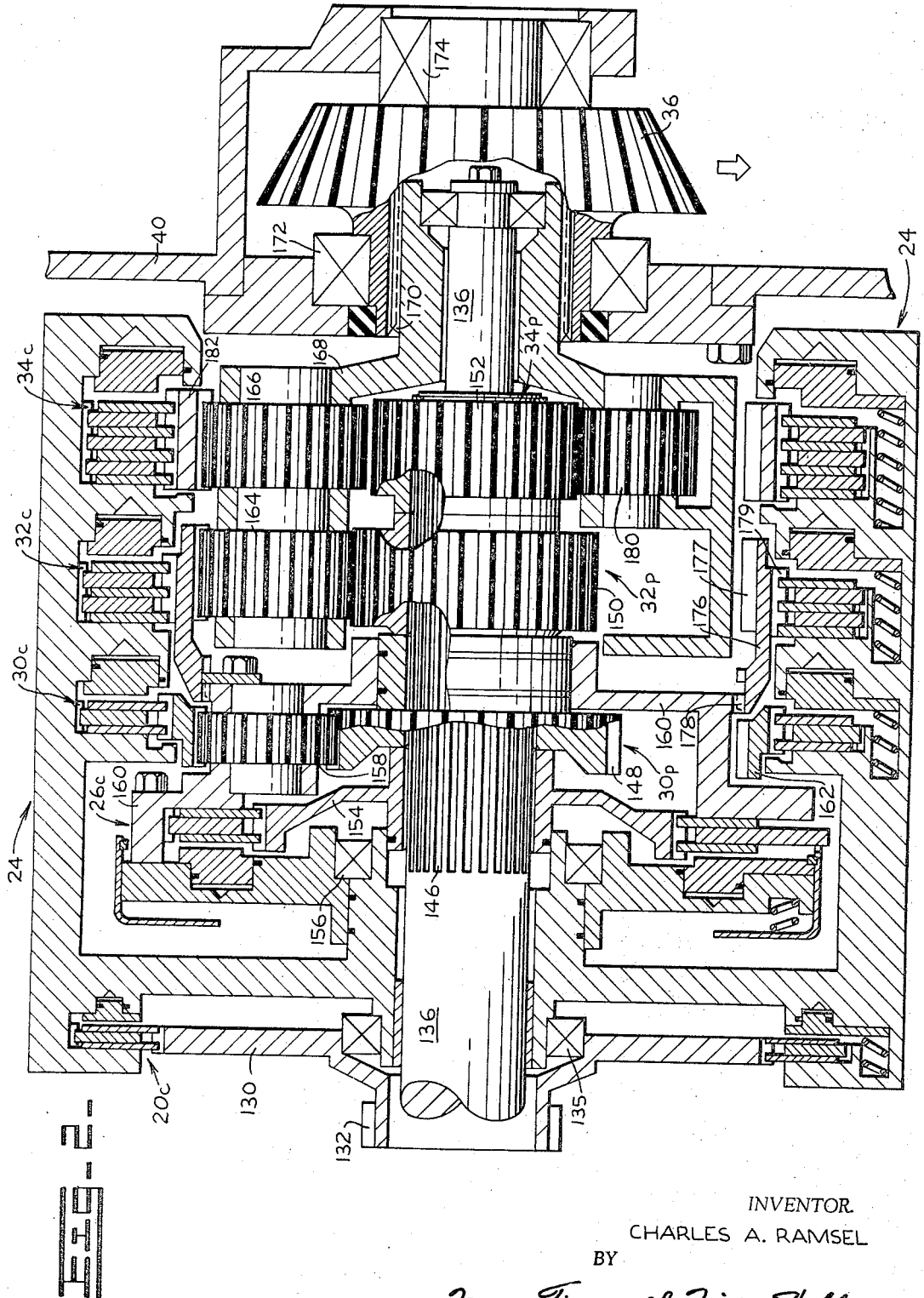

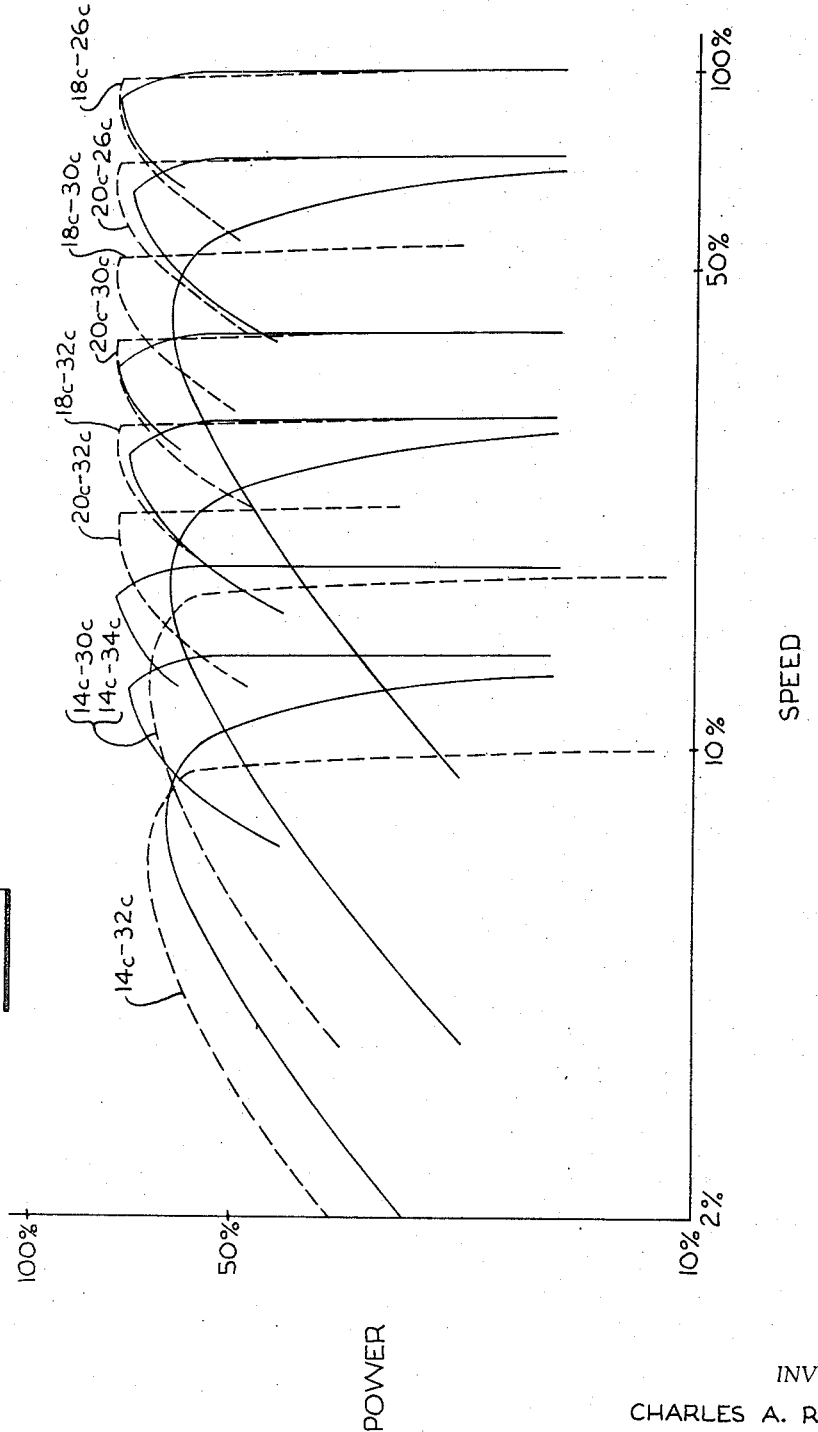

United States Patent Office 3,347,113
Patented Oct. 17, 1967

3,347,113
TRANSMISSION
Charles A. Ramsel, Houston, Tex., assignor to Caterpillar Tractor Co., Peoria, Ill., a corporation of California
Filed June 28, 1965, Ser. No. 467,267
5 Claims. (Cl. 74—688)

ABSTRACT OF THE DISCLOSURE

A drive transmission has a hydraulic torque convertor and two planetary gear sets with drive establishing means for conditioning the system to provide convertor drive at low vehicle speeds and to provide mechanical drive, including an underdrive and a direct drive, at higher speeds. The system may be coupled to a range transmission and is arranged to deliver relatively constant horsepower throughout a broad range of speeds.

---

This invention relates to a power transmission and more particularly to transmissions of the type including a hydraulic torque converter and several planetary gear sets arranged to transmit a relatively constant value of horsepower over a broad range of operating speeds.

The transmission of the present invention comprises a conventional torque converter associated with epicyclic gear trains which can be conditioned through a plurality of drive establishing devices to provide an input torque to a range transmission. The input power from the engine may be applied directly to the range transmission thus by-passing the torque converter or can be applied to the range transmission through the converter. Thus, converter drive or straight mechanical drive operations are available.

While in converter drive a high value of horsepower over a broad range of vehicle speed is obtained whereas in mechanical drive, designed to be employed at higher vehicle speeds, a series of narrow range steps can be selected which results in greater efficiency.

Consider the requirements of earthmoving apparatus, and in particular, a scraper. During the loading phase, which occurs at vehicle speed between two and four miles per hour, it is essential to provide sufficient torque over this range of speeds which does not require shifting of the transmission in the event the resistance encountered by the scraper varies. But, it is also to be realized that when such changes in speed take place, it is important to minimize tire wear such as would occur in the event the tires should slip.

One of the primary objectives of the transmission of this invention is to provide performance characteristics, at such times when a scraper is being loaded, whereby increases in torque requirements due to corresponding increases in the weight of the scraper and load increases on the ground engaging scraper bowl cutting edge are accomplished within narrow limits of vehicle ground speed so that in the event of tire slippage, the speed of such slip will be much less than the slippage produced in presently known transmissions. As a result of this characteristic, increases in load do not cause the converter to change speed appreciably since it is running at substantially converter run-out speed.

At higher vehicle speeds, for example, from approximately six miles to thirty miles per hour which is the speed range at which the loaded scraper is run when transporting earth, the transmission of this invention is conditioned for straight mechanical drive and the speed ranges available in the various gears are so selected that a minimum horsepower gap is produced between steps. Accordingly, the output horsepower of the system is more uniform throughout the various high speed ranges.

Accordingly, it is a primary object of this invention to provide a transmission having broad range operating characteristics at the lower vehicle ground speeds and narrow, but highly efficient performance at the higher ground speeds.

Another object of this invention is to provide a transmission which is selectively operable to produce either converter or straight mechanical drive.

It is another object of this invention to obviate shifting of the transmission in the lower speeds due to varying requirements of torque by providing a converter drive which has a broad operating range.

Another and more important object of this invention is to provide a transmission of the above described character in which varying requirements of output torque during the loading phase are accompanied by small changes in vehicle speed.

These and other objects and advantages of this invention will be readily apparent from consideration of the following description and the drawings in which:

FIG. 1 is a longitudinal section of the forward portion of the transmission showing the converter and the associated first and second planetary gear sets;

FIG. 2 is also a longitudinal section of the rear portion of the transmission showing the range transmission and the output shaft;

FIGS. 3–8 are schematic representations showing the power path in heavy directional lines when the various drive establishing devices are actuated; and FIG. 9 is a graphical representation showing the characteristics of the transmission wherein the percentage of power developed is plotted against speed percentages.

Referring now to FIGS. 1 and 2, it will be seen that the transmission constructed according to this invention comprises the conventional hydrodynamic torque converter 10 and a front gear box 12 including a converter drive planetary set 14p associated with a brake 14c which is effective, when actuated, to transfer the output torque of the converter 10 to a second planetary set 18p. The second planetary set is associated with a rotating clutch assembly 18c which may be actuated to condition the forward portion of the transmission for straight mechanical drive, and is also associated with a brake 20c which may be actuated to effect an underdrive mechanical drive. The output of the front gear box 12 is connected to the input of a range transmission 24 which includes a rotating clutch mechanism 26c which, when energized, conditions the range transmission for high speed drive, and three planetary sets 30p, 32p, and 34p associated, respectively, with brakes 30c, 32c and 34c. Upon energization of the brake 30c, the range transmission is in intermediate drive whereas energization of the brake 32c conditions the range transmission for low drive. The planetary set 34p and its brake 34c establish reverse drive. A gear 36 is mounted on the output of the range transmission.

Input torque from the engine is transmitted to the transmission by a gear 46 rotatably supported by a bearing 42 located in the front wall of the transmission housing 40 and a bearing 44 located in a supporting structure 43. The gear 46 is formed with a splined bore 48 for receiving a splined hub 50 of an impeller assembly 52. The rearward portion of the impeller assembly 52 is rotatably mounted by a bearing 54 to a stationary housing 56. The impeller assembly also includes the usual pump blades 58 being secured in circumferentially spaced relationship to the rearward wall of the assembly 52 and which are effective to circulate the fluid in the direction indicated by the arrows to impart rotation to a turbine runner 60 which has secured thereto a series of circumferentially spaced vanes 62. An elongate tubular shaft 64, mounted for rotation by means of bearings 66 and 68, is formed with a radially extended flange portion 70 which is secured, by means of a series of rivets 72, to the turbine runner 60.

Reaction blades 76, mounted between inner and outer rings 78 and 80, are connected to the stationary housing 56 through a conventional overrunning clutch 82 by a rearwardly extending tubular portion 84 being splined at 86. The overrunning clutch permits free wheeling movement of the reactor blades 76 at the higher converter speed ratio of operation causing the converter to perform as a fluid coupling.

The impeller assembly 52 has rigidly secured thereon a gear 88 serving to drive a double oil pump system (not shown) which supplies pressurized fluid to the transmission control system, for charging and cooling the converter, and which provides a source of pressure fluid for actuating the various clutch and brake packs. Fluid from one of the pumps is directed to the interior of the converter by a small passageway 90 and is returned to the pumps by a passageway 92.

The hub 50 of the impeller assembly is drivingly connected to one end of a central shaft 94 by a spline connection 96 and the other end of the shaft is splined at 98 for connection with a generally dish-shaped gear 100 which is part of the planetary set 18p. According to the above construction, it will be seen that the torque derived from the input gear 46 is directed to the impeller assembly 52 as well as gear 100.

Rotation of the tubular shaft 64 is transmitted to a sun gear 102 by virtue of a spline connection 104, thus serving to impart the output of the converter to planetary set 14p. The converter drive planetary set comprises a plurality of planet gears 106 in meshing engagement with the sun gear 102 and rotatably mounted on a planet carrier 108 which in turn is rotatably mounted on the stationary housing 56 by a bearing 110. A ring gear 112 is provided with internal teeth in meshing engagement with the planet gears 106 and external teeth drivingly supporting the plates 114 of the converter drive brake 14c. In addition, the brake 14c includes an actuator piston 116 which operates to hold the plates 114 and the ring gear 112 against rotation.

The second planet set 18p can be conditioned to impart direct mechanical or converter drive to the range transmission 24 by virtue of its direct connection to the planet carrier 108 and the shaft 94. The planet set 18p comprises a planet carrier 118 rotatably supporting a plurality of planet gears 120 which are in meshing engagement with internal gear teeth 122 formed on the dish-shaped gear 100. The planet carrier 118 is rigidly connected to the planet carrier 108 by means of a series of bolts 124. These carriers are formed to include therebetween the clutch assembly 18c comprising an actuator piston 126 and clutch plates 128 which are suitably engaged in a conventional manner to gear teeth 129 formed on the outer periphery of the dish-shaped gear 100.

The front gear box 12 also includes the underdrive brake assembly 20c which is connected through its plates to a disc-shaped gear 130 formed with gear teeth 132 in meshing engagement with the planet gears 120, and gear teeth 133 carrying the plates. The gear 130 is rotatably supported on the housing of the range transmission 24 by a bearing 135.

In view of the above described arrangement, it will be seen that the output torque of the front gear box 12, whether in converter or direct mechanical or underdrive, will be imparted on the carrier 118 which is arranged to transmit such torque to the range transmission 24. The carrier 118 is formed with a splined bore 139 having disposed therein a splined portion 134 of the range transmission shaft 136. Further description of the range transmission will be given hereinafter.

To establish converter drive which is shown schematically in FIG. 3, brake 14c is actuated holding the ring gear 112 against rotation. Under these circumstances, the output torque of the converter, which is transmitted by the tubular shaft 64 to the sun gear 102, is transmitted to the planet carrier 108 and to the planet carrier 118 which is rigidly connected thereto. By virtue of the spline connection 134, this torque is transmitted to the range transmission shaft 136.

Direct drive, shown schematically in FIG. 4, is established by actuating the rotating clutch 18c to thereby directly connect the input shaft 94, which is coupled to the engine, to the planet carrier 118 transferring such torque to the range transmission shaft 136 by the spline connection 134.

To establish an underdrive in the front gear box 12, the brake 20c is actuated holding the gear 132 against rotation. The path of power under this condition is shown schematically in FIG. 5. It will be noted that the torque to the shaft 94 is transmitted to the planet gears 120 by the gear 100 and the reaction provided by the gear teeth 132 imparts a low speed rotation to the planet carrier 118 which again transfers the torque to the shaft 136 through the spline connection 134.

The rotating clutch assembly 18c is provided with means for positively disengaging its actuator 126 and such means comprise an annular cup-shaped member 140 connected to the actuator 126 by a snap ring 142. Due to the centrifugal force, it is difficult to exhaust the actuating fluid from behind the piston 126 when it is desired to release the clutch 18c even though a plurality of release springs 144 are included for this purpose. To assist in retracting the actuator piston 126 fluid from any suitable source is supplied to the cup-shaped member which by virtue of the centrifugal force is retained therein and exerts an axial force assisting the springs 144 in releasing the actuator 126. Further details of construction and operation of the rotating clutch release mechanism is shown and described in United States patent application Ser. No. 168,124, now Patent No. 3,217,851, filed Jan. 23, 1962, and assigned to the assignee of the present invention.

According to the above described construction, it can be appreciated that a choice of converter and direct mechanical and underdrive is available depending upon which of the three drive establishing devices 14c, 18c and 20c is actuated. While in converter drive a reduction of approximately 3.1 is achieved, whereas in underdrive the reduction is approximately 1.35.

*Range transmission*

The input shaft 136 of the range transmission which is driven by the planet carrier 118 through the spline 134 is provided with an elongated spline 146 upon which sun gears 148, 150 and 152 are mounted and which are in meshing engagement with the planetary sets 30p, 32p, and 34p, respectively. In addition to these sun gears, a clutch plate carrier 154, being part of the rotating clutch 26c, is mounted on the spline 146. The clutch 26c is rotatably mounted in the range transmission housing by a bearing 156 and it includes a centrifugal clutch releasing mechanism of the type briefly explained above and which is the subject of U.S. Patent application Ser. No. 168,124.

The planet set 30p comprises a plurality of planet gears 158 rotatably mounted on a planet carrier 160 which in turn is rigidly secured to the rotating clutch 26c. In addition to meshing with the sun gear 148, the planet gears are in meshing engagement with a ring gear 162 which includes an outer set of teeth carrying the plates for the brake 30c.

Planetary sets 32p and 34p include, respectively, planet gears 164 and 166 which are rotatably mounted on a common planet carrier 168 which is formed with a rearward splined extension 170 upon which is fitted the output bevel gear 36 rotatably supported to the transmission housing by inboard and outboard bearings 172 and 174, respectively. A ring gear 176 is coupled to the planet carrier 160 at 178 and has an internal gear 177 in meshing engagement with the planet pinions 164 and an external gear 179 carrying the plates for the brake 32c.

Accordingly, by virtue of the connection 178, the ring gear 176 rotates as a unit with the planet carrier 160.

The remaining planetary set 34p includes idler planet pinions 180 being effective to reverse the direction of rotation of the pinions 166 and thus define a compound planetary set for providing a reverse gear. As shown in FIG. 2, it will be noted that the pinions 180 are also rotatably mounted on the planet carrier 168 and are in meshing engagement with the sun gear 152 and the planet pinions 166. Reverse rotation is imparted to the carrier 168 when the brake 34c is actuated holding a ring gear 182 against rotation.

High speed range for the range transmission 24 is shown schematically in FIG. 6 and it is established when the clutch 26c is actuated rigidly connecting the planet carrier 160 to the shaft 136 permitting the torque to be transferred to the ring gear 176 causing rotation of the planet carrier 168 through the planet gears 164. Rotation of the planet gears 164 is also brought about by the sun gear 150 by virtue of its splined connection to the shaft 136. The resultant of both inputs to the planet gears 164 establishes a direct drive wherein the speed of rotation of the carrier 168 is equal to that of the shaft 136.

An intermediate drive ratio of the range transmission is established when brake 30c is actuated holding the ring gear 162 against rotation. Reference to FIG. 7 will show this power path. With the ring gear 162 being held against rotation, the planet carrier 160 is rotated by the sun gear 148 and such rotation is imparted to the planet gears 164, which are also engaged with sun gear 150 rotating at input shaft speed. The resultant is an intermediate underdrive of approximately 1.8 reduction transferred to the planet carrier 168 and to the bevel gear 36.

Low gear is established when the brake 32c is actuated holding the ring gear 176 against rotation so that the torque of the sun gear 150 rotates planet pinions 164 causing rotation of the carrier 168 and the bevel gear 36 which is rotationally rigid therewith. In low gear a reduction of approximately 3.3 is achieved.

Reverse gear is provided by the planetary set 34p which is achieved by actuation of the brake 34c, holding the ring gear 182 against rotation whereupon the input torque from the sun gear 152 causes rotation of the planet idler pinions 180 which in turn cause rotation of the planet pinions 166 which are in meshing engagement with ring gear 182. Planet carrier 168 is thus caused to rotate in reverse with a reduction of approximately 1.8.

Referring now to FIG. 9, wherein the characteristics of prior art transmissions are shown in solid lines and those of the present invention are shown in dash lines, it will be seen that the various curves are described when the indicated clutches are actuated. For example the first converter range characteristic, which falls sharply at approximately 10% speed, is established when brakes 14c and 32c are actuated; whereas the second converter range is established when brakes 14c and 30c or 14c and 34c are actuated. It will be noticed that these converter ranges produce a high average value of power over a broad range of speed such as would be required in accelerating a vehicle from a standing start or by a tractor subjected to a large draw bar pull force.

Attention is directed to the fact that the transmission of this invention is effective to transmit approximately 70% of rated engine power in all speed ranges thus a relatively constant value of horsepower over a broad range of speed. Horsepower losses are also kept to a minimum since the single power path for most gear speeds avoids regenerative gear action and the direct clutch 18c and underdrive brake 20c allow the turbine to rotate freely.

It is to be appreciated that when any one of the drive establishing devices 14c, 18c, or 20c are actuated any one of the drive establishing devices 26c, 30c, or 32c may be actuated. Thus in converter (14c), direct (18c) or underdrive (20c) there are available three ranges of speed which can be selected in the range transmission thus yielding nine forward speeds.

I claim:

1. A transmission comprising a drive member; a torque converter connected to said drive member; a first planetary gear set including a sun gear connected to the output of said torque converter, a planet carrier, a ring gear, and a brake selectively operable on said ring gear to condition said first planetary gear set for transmitting the torque of said converter to said planet carrier; a second planetary gear set including planet gears, a planet carrier, a friction clutch, and a ring gear; a shaft connecting said ring gear of said second gear set to said drive member; said planet carrier of said first gear set being rigidly connected to the planet carrier of said second gear set to cause rotation of said planet carriers as a unit; and a driven member connected to the planet carrier of said second gear set whereupon actuation of said brake, associated with said first gear set, transmits the torque of said converter to said driven member or actuation of said friction clutch associated with said second planetary set transmits the torque of said drive member to said driven member.

2. A transmission comprising a drive member; a torque converter connected to said drive member; a first planetary gear set including a sun gear rotated by the output of said torque converter and a planet carrier and a ring gear; a second planetary gear set having a ring gear rotated by said drive member and a sun gear and a planet carrier secured to the planet carrier of said first gear set; a brake selectively operative on said ring gear associated with said first gear set for transmitting the torque of said converter to said planet carriers to establish converter drive; a driven member defining the input to a range transmission, said driven member being connected to the carrier of said second planetary set; and clutch means associated with said second planetary set for transmitting the torque of said drive member to said driven member independently of said first gear set to thereby establish direct mechanical drive.

3. The combination defined in claim 2 further comprising an additional brake selectively operative on said sun gear of said second planetary gear set.

4. In a transmission a drive member; a driven member; a hydraulic torque converter; a first planetary gear set including a sun gear driven by the output of said converter, planet gears in meshing engagement with said sun gear, and a ring gear; a second planetary gear set including a ring gear driven by said drive member, and planet gears carried by a planet carrier rigidly connected to the carrier of said first gear set; said planet carrier associated with second gear set defining said driven member which is adapted to be connected to a range transmission; means for holding the ring gear of said first gear set against rotation to impart the output of said converter to the planet carrier of said second gear set and thereby establishing a low speed converter drive; and a rotating clutch operative directly between said ring gear of said second gear set and said planet carriers for selectively holding the ring gear of said second gear set against rotation relative to its associated planet carrier thereby effecting a direct mechanical drive between said drive and driven members.

5. A vehicle transmission comprising a hydrodynamic torque converter and an input shaft both of which are driven by an engine, a first planetary gear set including a ring gear and a sun gear driven by the output of said converter, a second planetary gear set including a ring gear drivingly connected to said shaft, a planet carrier rotatably supporting the planet gears of said first and second gear sets and forming the sole torque path between said first and second gear sets, a brake for holding said ring gear of said first gear set against rotation, and a rotating clutch mechanism for holding said ring gear of said second gear set against rotation relative to said planet carrier, whereupon actuation of said brake transmits the output torque of said converter to said planet carrier and actuation of said rotating clutch transmits the torque of said shaft to said planet carrier.

References Cited

UNITED STATES PATENTS

| | | | |
|---|---|---|---|
| 2,260,846 | 10/1941 | Voytech | 74—688 |
| 2,616,310 | 11/1952 | Jandasek | 74—688 |
| 2,736,407 | 2/1956 | Smirl | 74—688 |
| 2,749,773 | 6/1956 | Simpson | 74—688 |
| 2,749,777 | 6/1956 | Simpson | 74—688 |
| 2,899,844 | 8/1959 | Hattan | 74—688 |
| 3,057,225 | 10/1962 | Snyder | 74—688 |
| 3,132,535 | 5/1964 | Borman et al. | 74—688 |
| 3,199,374 | 8/1965 | O'Malley et al. | 74—688 |
| 3,205,730 | 9/1965 | Hause | 74—688 |
| 3,217,562 | 11/1965 | Stockton | 74—677 |

DONLEY J. STOCKING, *Primary Examiner.*

THOMAS C. PERRY, *Examiner.*